United States Patent
Zywot et al.

(10) Patent No.: US 8,232,702 B2
(45) Date of Patent: Jul. 31, 2012

(54) APPARATUS FOR A HIGH SPEED SLEEVELESS ROTOR

(75) Inventors: Jan Zywot, Centerville, OH (US); Xiaochuan Jia, Centerville, OH (US); Norman K. Austin, West Chester, OH (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 152 days.

(21) Appl. No.: 12/846,980

(22) Filed: Jul. 30, 2010

(65) Prior Publication Data

US 2012/0025639 A1    Feb. 2, 2012

(51) Int. Cl.
*H02K 3/48* (2006.01)

(52) U.S. Cl. ............... 310/214; 310/262

(58) Field of Classification Search ............ 310/262, 310/261.1, 214
See application file for complete search history.

(56) References Cited

U.S. PATENT DOCUMENTS

| | | | |
|---|---|---|---|
| 5,929,537 A | 7/1999 | Glennon | |
| 5,973,432 A * | 10/1999 | Katagiri et al. | 310/214 |
| 6,113,024 A * | 9/2000 | Pittard et al. | 242/433 |
| 6,188,158 B1 | 2/2001 | DeLuca et al. | |
| 6,351,090 B1 | 2/2002 | Boyer et al. | |
| 6,914,344 B2 | 7/2005 | Franchet et al. | |
| 7,227,271 B2 | 6/2007 | Anghel et al. | |
| 7,484,522 B2 | 2/2009 | Eick et al. | |
| 7,687,928 B2 | 3/2010 | Taneja et al. | |
| 2004/0263019 A1 * | 12/2004 | Buchan et al. | 310/214 |
| 2005/0093391 A1 | 5/2005 | McMullen et al. | |
| 2007/0090701 A1 * | 4/2007 | Down et al. | 310/51 |
| 2010/0090549 A1 | 4/2010 | Gerstler et al. | |

\* cited by examiner

*Primary Examiner* — Nguyen N Hanh

(74) *Attorney, Agent, or Firm* — David J. Clement, Esq.; Armstrong Teasdale LLP

(57) ABSTRACT

A high-speed sleeveless rotor for an electric machine is provided. The rotor includes a shaft rotatable about a longitudinal axis, and a rotor core circumscribing at least a portion of the shaft wherein the rotor core includes an axially oriented slot. The slot includes a radially outer slot opening, a radially inner slot floor, and a slot sidewall extending therebetween. The slot floor includes a topstick attachment member extending radially outward from the slot floor and configured to engage a topstick positioned in the slot opening and the slot sidewall includes a shoulder configured to engage the topstick, preventing radially outward movement of the topstick.

19 Claims, 6 Drawing Sheets

US 8,232,702 B2

APPARATUS FOR A HIGH SPEED SLEEVELESS ROTOR

BACKGROUND OF THE INVENTION

The field of the invention relates generally to aircraft engine synchronous machines, and more specifically, to an apparatus and system for a sleeveless high-speed engine starter/generator rotor.

At least some known synchronous machine rotors rotate at high rate of rotational velocity. Centrifugal forces acting on components housed in the rotor are related to a mass of the component, a rotating speed of the rotor, and on a distance to the component from a center of rotation of the rotor. To contain the rotor components within the rotor envelope, known rotors use a sleeve into which the stacked laminations and components of the rotor are pressed. The rotor containment sleeve maintains the rotor stresses at acceptable levels. However, the rotor containment sleeve also increases an assembly weight of the rotor and hence the synchronous machine and increases the distance of the airgap between the main rotor and the stator decreasing the magnetic efficiency of the machine.

BRIEF DESCRIPTION OF THE INVENTION

In one embodiment, a high-speed sleeveless rotor for an electric machine includes a shaft rotatable about a longitudinal axis, and a rotor core circumscribing at least a portion of the shaft wherein the rotor core includes an axially oriented slot. The slot includes a radially outer slot opening, a radially inner slot floor, and a slot sidewall extending therebetween. The slot floor includes a topstick attachment member extending radially outward from the slot floor and configured to engage a topstick positioned in the slot opening and the slot sidewall includes a shoulder configured to engage the topstick, preventing radially outward movement of the topstick.

In another embodiment, a high-speed sleeveless rotor for an electric machine includes a plurality of laminations each having an outer peripheral edge stacked face-to-face along a rotor shaft forming a rotor core having an outer peripheral surface including the edges of the plurality of laminations. The rotor also includes a plurality of axial slots spaced at a predetermined interval in the circumferential direction of the rotor core, each axial slot is closed by a topstick extending at least partially along a length of the slot. Each axial slot includes an engagement surface configured to engage a radially outer lip of the topstick, a side wall extending radially inwardly toward a slot floor, and an attachment member extending radially outward from the slot floor. The attachment member is configured to engage at least one of the topstick and a topstick wedge such that centrifugal forces generated in one or more components positioned within the slot are shared between the attachment member and the engagement surface.

In yet another embodiment, a lamination for a laminated core of an electric machine includes a unitary planar body that includes an outer peripheral edge, an inner peripheral edge spaced radially from the outer peripheral edge, and a plurality of openings that extend through the body from the outer peripheral edge radially inwardly such that the openings are arcuately spaced about the body. The openings each include a slot floor edge between the outer peripheral edge and the inner peripheral edge. The slot floor edge includes a topstick attachment member extending radially outward therefrom and configured to engage at least one of a topstick and a topstick wedge.

BRIEF DESCRIPTION OF THE DRAWINGS

FIG. 1 is a schematic electrical diagram of an engine starter/generator (ES/G) assembly;

FIG. 2 is a perspective view of the rotor assembly shown in FIG. 1;

FIG. 3 is an axial view of a portion of a main rotor lamination of the plurality of laminations shown in FIGS. 1 and 2;

FIG. 4 is an axial view of a portion of main rotor lamination of the plurality of laminations shown in FIGS. 1 and 2 in accordance with another exemplary embodiment of the present invention;

FIG. 5 is an axial view of a portion of main rotor lamination of the plurality of laminations shown in FIGS. 1 and 2 in accordance with still another exemplary embodiment of the present invention; and FIG. 6 is an axial view of a portion of main rotor lamination of the plurality of laminations shown in FIGS. 1 and 2 in accordance with still another exemplary embodiment of the present invention.

DETAILED DESCRIPTION OF THE INVENTION

The following detailed description illustrates embodiments of the invention by way of example and not by way of limitation. It is contemplated that the invention has general application to rotating machinery in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
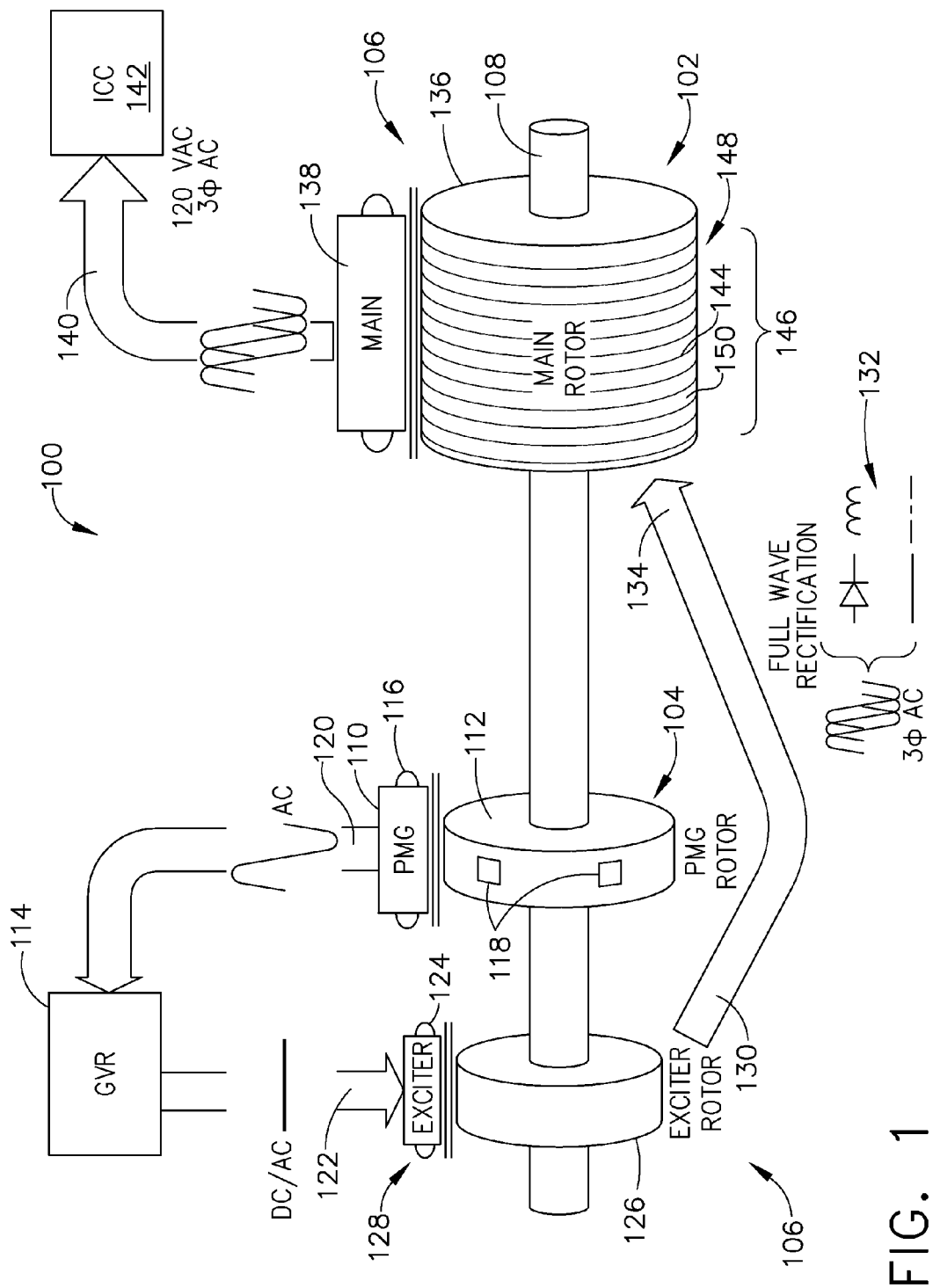
FIGS. 1-6 show exemplary embodiments of the rotor and lamination described herein.

FIG. 1 is a schematic electrical diagram of an engine starter/generator (ES/G) assembly 100 including a main generator 102, a permanent magnet generator (PMG) 104, and an exciter 106 in accordance with an exemplary embodiment of the present invention. In the exemplary embodiment, ES/G assembly 100 includes a rotor assembly 106 comprising a shaft 108.

In the exemplary embodiment, PMG 104 includes a PMG stator 110 and a PMG rotor 112. PMG stator 110 supplies electrical power to a generator voltage regulator (GVR) 114. AC voltage is induced in stator windings 116 by rotating permanent magnets 118 of the PMG 104. GVR 114 circuitry rectifies and modulates an output 120 of PMG 104. An output 122 of GVR 114 is fed back to an exciter field winding 124, generating an AC voltage on an exciter rotor 126, which causes a current flow. Exciter 106 is a brushless, synchronous machine with a stator 128 and three-phase wound exciter rotor 126. Exciter stator 128 has a three-phase winding during a start mode and a DC winding during a generate mode. The magnitude of AC voltage output of exciter 106 is proportional to the DC excitation current on field winding 124 and a rotational speed of rotor 126.

An AC output 130 of rotor 126 is rectified with a full wave bridge of a plurality of diode rectifiers 132, mounted axially inside shaft 108 for direct contact oil cooling and low inertial forces. A DC output 134 from diode rectifiers 132 supplies field current to main generator 102.

Main generator 102 includes a wound multiple-pole main rotor 136 and a star-connected 3Ø main stator 138. The magnitude of a voltage output 140 of main stator 138 is proportional to DC output 134 current supplied by the exciter rotor 126 and a rotational speed of main rotor 136. The DC excitation voltage of output 122, supplied to field winding 124 determines a magnitude of the output power from main generator 102.

The electrical output 140 of main stator 138 of main generator 102 is fed into a respective inverter/converter controller (ICC) 142. During continuous power generating modes, AC output 140 (120 Vac) of main generator 102 is rectified into for example, 270 Vdc for distribution.

Rotor 106 is a sleeveless high speed rotor design capable of a rotational speed greater than 24,000 rpm. Being sleeveless, an outer peripheral edge 144 of a plurality of laminations 146 that are stacked together to form a rotor core 148 is also an outer peripheral extent 150 of rotor 136.

Figure 2:
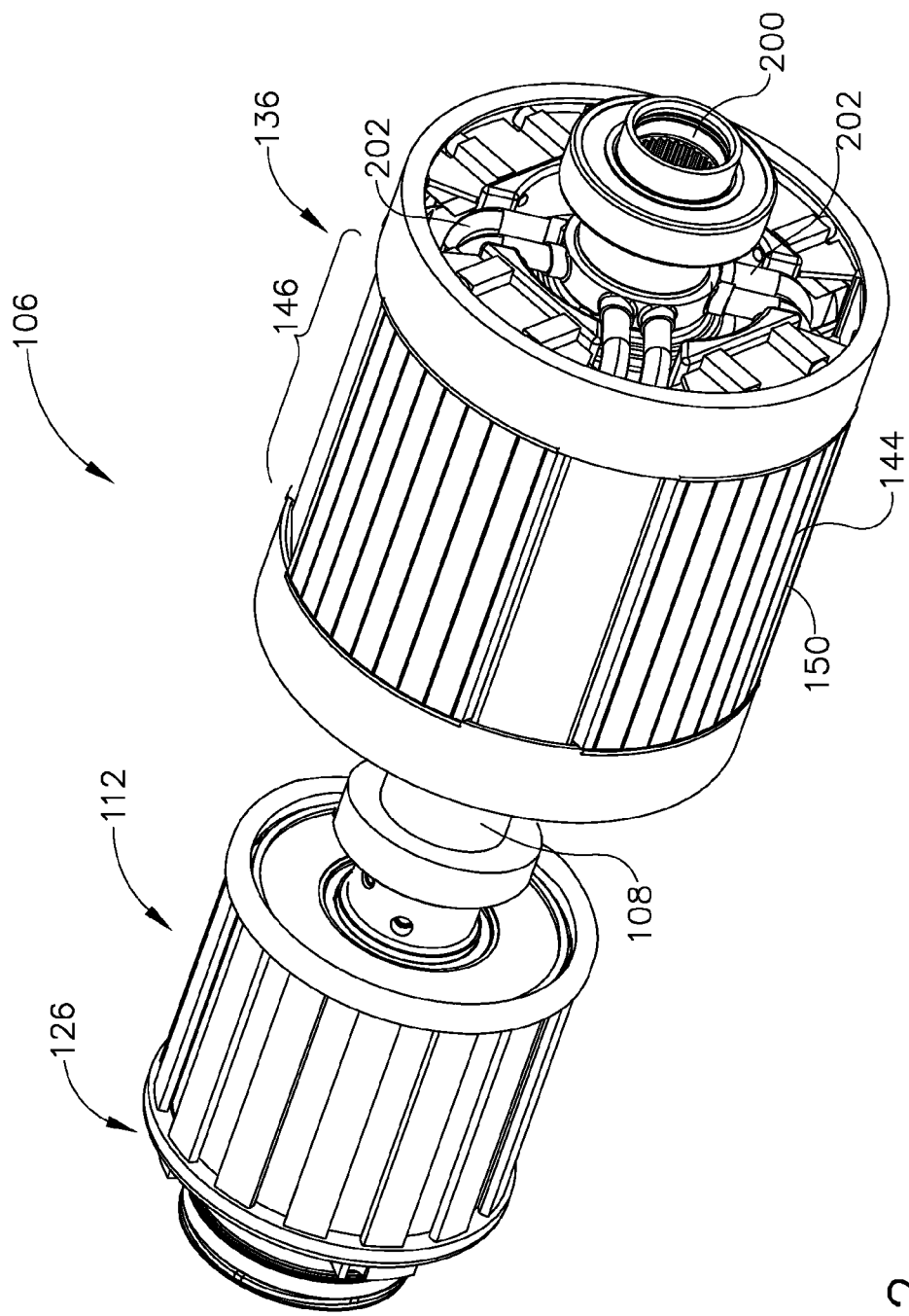

FIG. 2 is a perspective view of rotor assembly 106 (shown in FIG. 1) in accordance with an exemplary embodiment of the present invention. As shown in FIG. 1, rotor assembly 106 includes exciter rotor 126, PMG rotor 112, and main rotor 136 mounted on common shaft 108. In the exemplary embodiment, shaft 108 is hollow and forms a conduit 200 for cooling oil and a mounting space for, for example, diode rectifiers 132. In the exemplary embodiment, main rotor 136 includes an onboard portion of a rotor oil cooling system (not shown in FIG. 2). The onboard portion includes oil piping connections 202 configured to couple respective main rotor oil cooling tubes (not shown in FIG. 2) to shaft 108.

Figure 3:
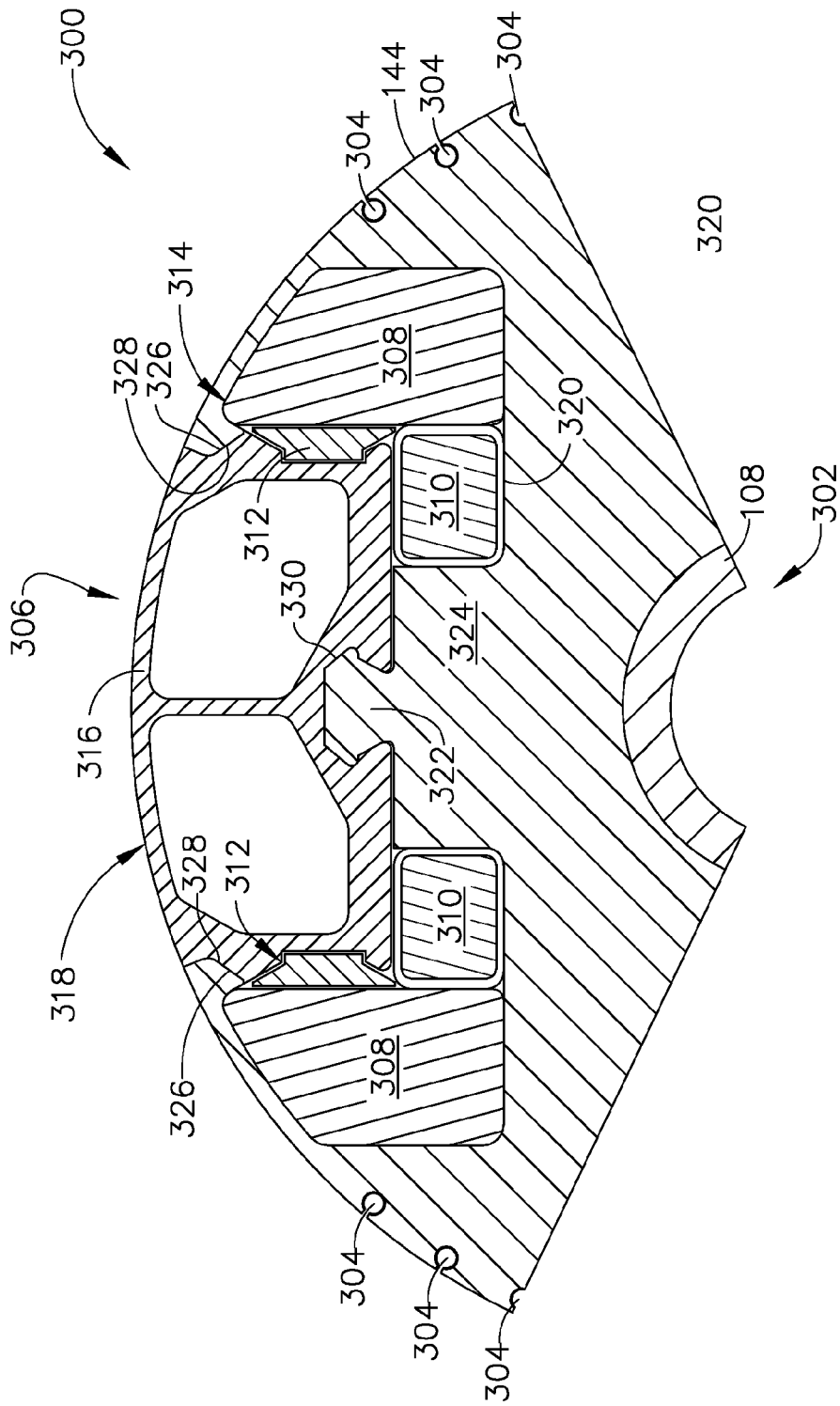

FIG. 3 is an axial view of a portion of a main rotor lamination 300 of the plurality of laminations 146 (shown in FIGS. 1 and 2) in accordance with an exemplary embodiment of the present invention. In the exemplary embodiment, lamination 300 includes a substantially circular cross-section of which only a portion is shown. Lamination 300 includes outer peripheral edge 144 (shown in FIG. 1) that forms a part of outer peripheral extent 150 of rotor 136 when rotor 136 is fully assembled. It should be noted that rotor 136 does not include a sleeve that is used in prior art high-speed rotors to reduce the stresses of containing the centrifugal forces acting on the rotor that must be otherwise accommodated by the laminations.

Lamination 300 includes a center bore 302 that circumscribes shaft 108 when lamination 300 is installed on shaft 108. Lamination 300 includes a plurality of copper bar apertures 304 circumferentially spaced about edge 144. In one embodiment, apertures 302 are open to edge 144 and in various other embodiments, apertures 304 are closed to edge 144.

Lamination 300 further includes a main slot 306 for carrying various rotor borne components of ES/G assembly 100. For example, main slot 306 is sized and configured to house main rotor windings 308, main rotor oil tubes 310, main rotor winding wedges 312, a slot liner 314, and a main rotor topstick 316.

Main slot 306 includes an opening 318 and a slot floor 320. In contrast to prior art rotor slots, slot floor 320 includes an attachment member 322 that extends radially outward from slot floor 320 at least partially into slot 306. In the exemplary embodiment, attachment member 322 includes an extension 324 between slot floor 320 and attachment member 322. During operation, topstick 316 secures the various rotor borne components during rotor rotation. Topstick 316 is secured to main rotor 136 using a topstick engagement surface 326 configured to engage a complementary engagement surface 328 on lamination 300. Additionally, topstick 316 is secured to main rotor 136 using an attachment slot 330 formed in a radially inner side of topstick 316 and attachment member 322. In the exemplary embodiment, attachment member 322 is dovetail-shaped and attachment slot 330 is complementarily shaped to engage attachment member 322. Restraining topstick 316 using an engagement method proximate the periphery of lamination 300 and restraining topstick 300 using an attachment method at radially inner attachment member 322 permits operating main rotor 136 at relatively high rotational speeds without using a rotor sleeve.

Figure 4:
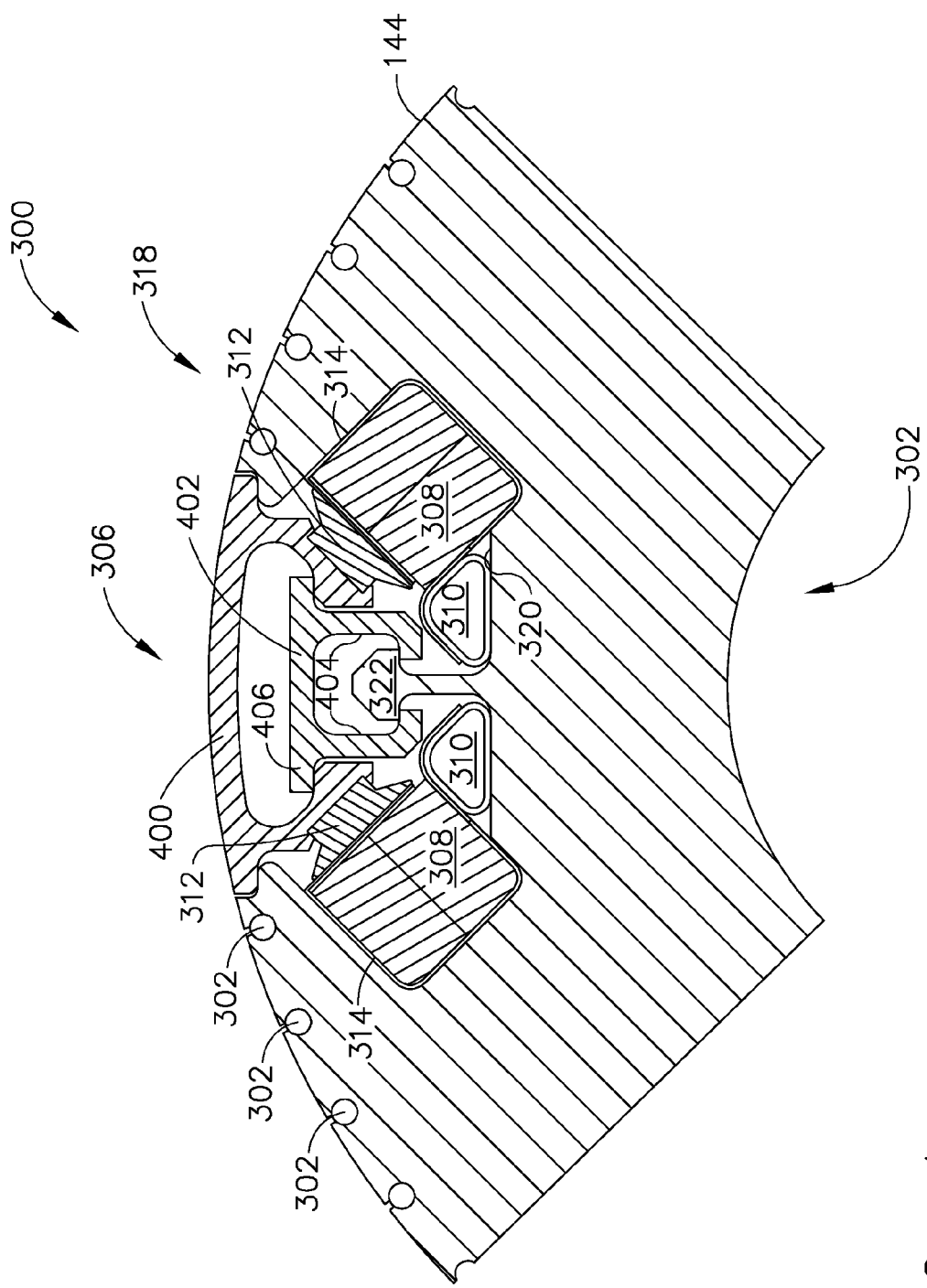

FIG. 4 is an axial view of a portion of main rotor lamination 300 of the plurality of laminations 146 (shown in FIGS. 1 and 2) in accordance with another exemplary embodiment of the present invention. In the exemplary embodiment, lamination 300 includes a substantially circular cross-section of which only a portion is shown. Lamination 300 includes outer peripheral edge 144 (shown in FIG. 1) that forms a part of outer peripheral extent 150 of rotor 136 when rotor 136 is fully assembled.

Lamination 300 includes center bore 302 that circumscribes shaft 108 when lamination 300 is installed on shaft 108. Lamination 300 includes plurality of copper bar apertures 304 circumferentially spaced about edge 144. In one embodiment, apertures 302 are open to edge 144 and in various other embodiments, apertures 304 are closed to edge 144.

Lamination 300 further includes main slot 306 for carrying various rotor borne components of ES/G assembly 100. For example, main slot 306 is sized and configured to house main rotor windings 308, main rotor oil tubes 310, main rotor winding wedges 312, slot liner 314, and a main rotor topstick 400. In the exemplary embodiment, a main rotor topstick wedge 402 includes a first securement member 404 configured to couple to attachment member 322 and a second securement member 406 configured to couple to main rotor topstick 400.

Main slot 306 includes opening 318 and slot floor 320 that includes attachment member 322. Attachment member 322 extends radially outward from slot floor 320 at least partially into main slot 306. Topstick 400 is secured to main rotor 136 using main rotor topstick wedge 402 and attachment member 322. In the exemplary embodiment, main rotor topstick wedge 402 is secured to main rotor 136 using first securement member 404 formed in a radially inner side of main rotor topstick wedge 402. In the exemplary embodiment, attachment member 322 is dovetail-shaped and first securement member 404 is complementarily shaped to engage attachment member 322. In an alternative embodiment, attachment member 322 comprises for example, a slot and first securement member 404 is complementarily shaped to the slot to engage attachment member 322. Additionally, attachment member 322 may comprise a fastener coupled to a complementary insert formed or attached to rotor 136. Restraining topstick 316 using the above described attachment method at radially inner attachment member 322 permits operating main rotor 136 at relatively high rotational speeds without using a rotor sleeve.

Figure 5:
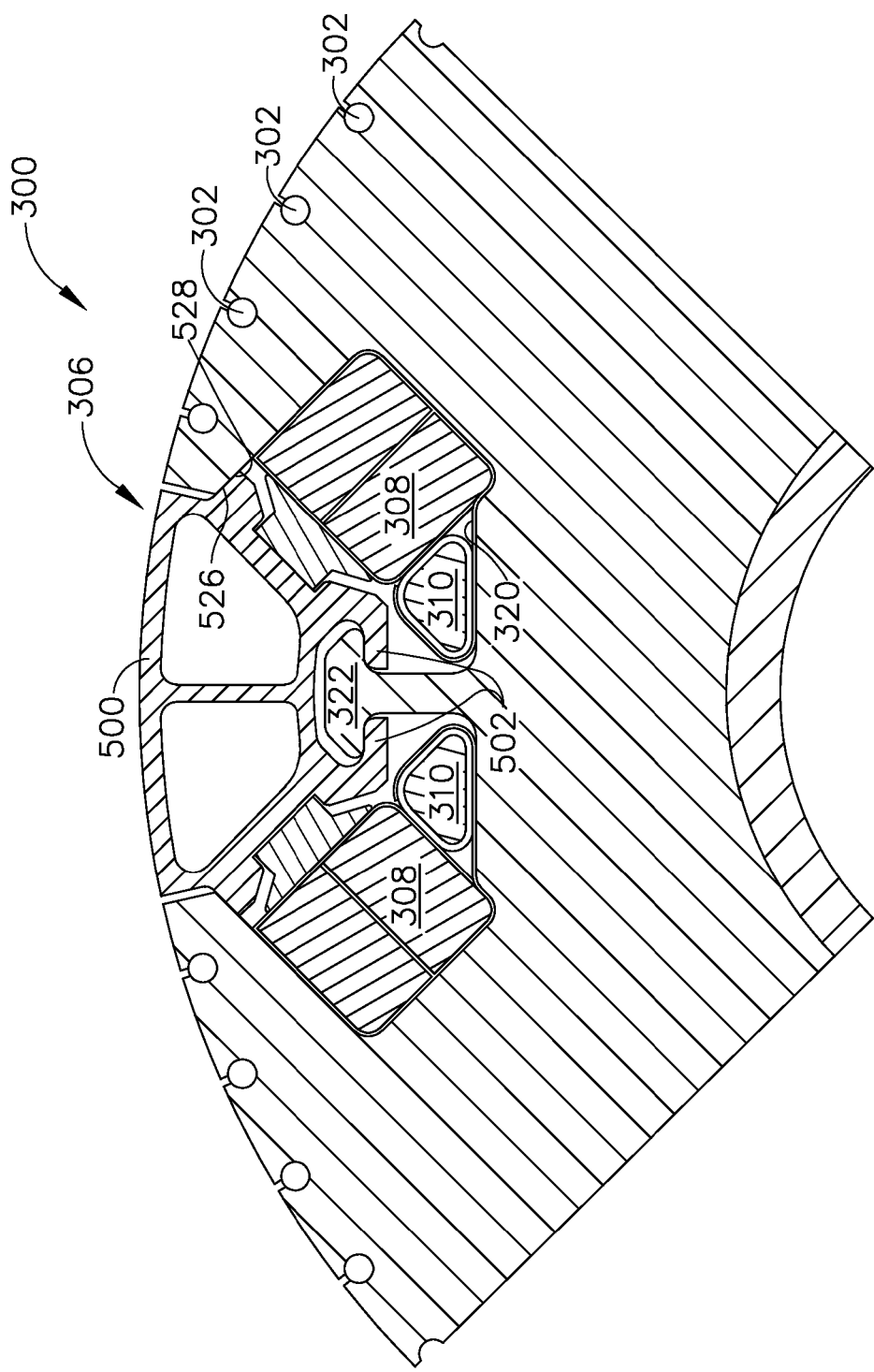

FIG. 5 is an axial view of a portion of main rotor lamination 300 of the plurality of laminations 146 (shown in FIGS. 1 and 2) in accordance with still another exemplary embodiment of the present invention. In the exemplary embodiment, main rotor topstick 500 is a single unitary piece that substantially combines the structures of main rotor topstick wedge 400 (shown in FIG. 4) and main rotor topstick 400 (shown in FIG. 4). Main rotor topstick 500 is secured to rotor 136 using attachment member 322 and a securement member 502 that is substantially similar to securement member 404 (shown in FIG. 4). Main rotor topstick 500 includes a topstick engagement surface 526 configured to engage a complementary engagement surface 528. Accordingly, main rotor topstick 500 is retained within rotor 136 using two independent methods such that centrifugal forces acting on components in slot 306 are shared between attachment member 322 and engagement surface 528, permitting rotor 136 to be fabricated without a sleeve.

Figure 6:
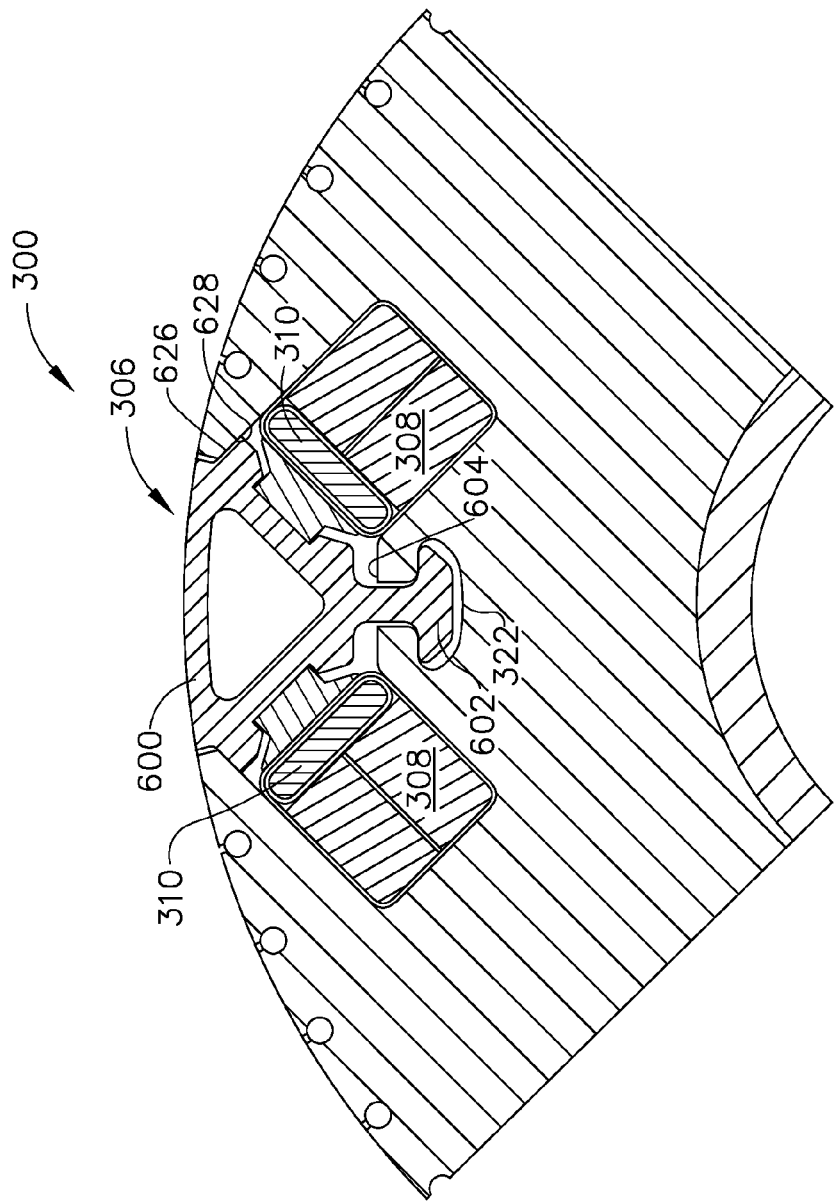

FIG. 6 is an axial view of a portion of main rotor lamination 300 of the plurality of laminations 146 (shown in FIGS. 1 and 2) in accordance with still another exemplary embodiment of the present invention. In the exemplary embodiment, main rotor topstick 600 is a single unitary piece that is secured to rotor 136 using attachment member 322 and a securement member 602. In the exemplary embodiment shown in FIG. 6, attachment member 322 comprises an axial slot extending radially inwardly from a slot floor 604 and securement member 602 comprises a tab extending radially inwardly from securement member 602 to engage the slot. Main rotor topstick 600 includes a topstick engagement surface 626 configured to engage a complementary engagement surface 628. Accordingly, main rotor topstick 600 is retained within rotor 136 using two independent methods such that centrifugal forces acting on components in slot 306 are shared between attachment member 322 and engagement surface 628, permitting rotor 136 to be fabricated without a sleeve.

The above-described embodiments of a rotor and a lamination for a high-speed sleeveless rotor provides a cost-effective and reliable means for fabricating a high speed rotor that transfers the centrifugal forces acting on a rotor slot topstick to additional areas reducing the concentrated forces in one area. More specifically, the rotor and a lamination described herein facilitate reducing a weight of the rotor by eliminating the need for a rotor sleeve. In addition, the above-described rotor and a lamination facilitate securing the topstick in the rotor slots by providing additional areas of support for the topstick. As a result, the rotor and a lamination described herein facilitate improving the magnetic efficiency of the rotor field windings and the weight of the rotor in a cost-effective and reliable manner.

An exemplary rotor and a lamination for facilitate improving the magnetic efficiency of the rotor field windings and the weight of the rotor are described above in detail. The apparatus illustrated is not limited to the specific embodiments described herein, but rather, components of each may be utilized independently and separately from other components described herein. Each system component can also be used in combination with other system components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A high-speed sleeveless rotor for an electric machine, said rotor comprising:
a shaft rotatable about a longitudinal axis; and
a rotor core circumscribing at least a portion of said shaft, said rotor core comprising an axially oriented slot, said slot comprising a radially outer slot opening, a radially inner slot floor, and a slot sidewall extending therebetween, said slot floor comprising a topstick attachment member extending radially outward from said slot floor and configured to engage a topstick positioned in said slot opening, said slot sidewall comprising a shoulder configured to engage the topstick, preventing radially outward movement of the topstick, said topstick attachment member comprising a slot configured to engage a complementarily-shaped tab in the topstick.

2. A rotor in accordance with claim 1, wherein said shaft is hollow, said rotor further comprising a cooling oil system comprising:
one or more oil tubes positioned in said slot, said oil tubes configured to retain a flow of cooling oil within said oil tubes; and
an oil tube connector configured to couple the one or more oil tubes in flow communication with the hollow interior of said shaft.

3. A rotor in accordance with claim 1, wherein said topstick is configured to engage said shoulder and said topstick attachment member such that centrifugal forces tending to move said topstick radially outward are opposed by said shoulder and said topstick attachment member.

4. A rotor in accordance with claim 1, further comprising one or more electrical winding sets positioned within said slot.

5. A rotor in accordance with claim 1, wherein said rotor core comprises a plurality of laminations stacked together in a face-to-face orientation.

6. A rotor in accordance with claim 1, wherein said rotor core comprises a plurality of laminations each having a substantially circular cross-section and outer peripheral edge wherein said outer peripheral edges form an outer peripheral surface of said rotor core.

7. A rotor in accordance with claim 1, wherein said topstick attachment member comprises a tab configured to engage a complementarily-shaped slot in the topstick.

8. A rotor in accordance with claim 1, further comprising a topstick wedge configured to engage said topstick attachment member and said topstick such that centrifugal forces tending to move said topstick radially outward are opposed by said topstick attachment member through said topstick wedge.

9. A high-speed sleeveless rotor for an electric machine, said rotor comprising:
a plurality of laminations each having an outer peripheral edge stacked face-to-face along a rotor shaft forming a rotor core having an outer peripheral surface comprising the edges of the plurality of laminations;
a plurality of axial slots spaced at a predetermined interval in the circumferential direction of the rotor core, each axial slot closed by a topstick extending at least partially along a length of the slot, each axial slot comprising:
an engagement surface configured to engage a radially outer lip of the topstick;
a side wall extending radially inwardly toward a slot floor; and
an attachment member extending radially outward from said slot floor, said attachment member configured to engage at least one of the topstick and a topstick wedge such that centrifugal forces generated in one or more components positioned within the slot are shared between said attachment member and said engagement surface.

10. A rotor in accordance with claim 9, wherein said component comprises at least one of a field winding and an oil cooling tube.

11. A rotor in accordance with claim 9, wherein said attachment member comprises at least one of a tab configured to engage a complementarily-shaped slot in at least one of the topstick and a topstick wedge and a slot configured to engage a complementarily-shaped tab in the at least one of the topstick and the topstick wedge.

12. A rotor in accordance with claim 9, further comprising a hollow shaft, said rotor further comprising a cooling oil path comprising an oil cooling tube extending axially in said slot, a respective cooling oil connection configured to couple the oil cooling tube in flow communication with said hollow shaft.

13. A rotor in accordance with claim 12, wherein said oil cooling path is a closed path such that the one or more components outside of the cooling oil path are not in contact with oil.

14. A rotor in accordance with claim 9, wherein said topstick wedge is configured to engage said attachment member and said topstick such that centrifugal forces acting on the topstick are transferred to the attachment member through the topstick wedge.

15. A lamination for a laminated core of an electric machine, said lamination comprising a unitary planar body comprising:
an outer peripheral edge;
an inner peripheral edge spaced radially from said outer peripheral edge; and
a plurality of openings that extend through said body from said outer peripheral edge radially inwardly such that said openings are arcuately spaced about said body, said openings each comprising a slot floor edge between said outer peripheral edge and said inner peripheral edge, said slot floor edge comprising a topstick attachment member extending radially outward therefrom and configured to engage at least one of a topstick and a topstick wedge.

16. A lamination in accordance with claim 15 wherein said outer peripheral edge comprises an outer peripheral surface of said laminated core.

17. A lamination in accordance with claim 15 wherein said opening is sized to receive at least one of a rotor winding and a cooling oil tube when said laminated core is fully assembled.

18. A lamination in accordance with claim 15 wherein said outer peripheral edge defines a substantially circular cross-section of said lamination, and said inner peripheral edge defines a bore substantially concentric with said substantially circular cross-section of said lamination.

19. A lamination in accordance with claim 15 wherein said topstick attachment member comprises at least one of a tab configured to engage a complementarily-shaped slot in the topstick and a slot configured to engage a complementarily-shaped tab in the topstick.

* * * * *